(12) United States Patent
Martens

(10) Patent No.: US 12,490,838 B2
(45) Date of Patent: Dec. 9, 2025

(54) CUSTOMIZABLE CUSHIONING STRUCTURE FOR ADDRESSING MEDICAL CONDITIONS AND SYMPTOMS

(71) Applicant: MAJESTIC BED, LLC, Royal Oak, MI (US)

(72) Inventor: Wendell Alan Martens, Royal Oak, MI (US)

(73) Assignee: MAJESTIC BED, LLC, Royal Oak, MI (US)

( * ) Notice: Subject to any disclaimer, the term of this patent is extended or adjusted under 35 U.S.C. 154(b) by 0 days.

(21) Appl. No.: 17/121,633

(22) Filed: Dec. 14, 2020

(65) Prior Publication Data

US 2021/0186228 A1  Jun. 24, 2021

Related U.S. Application Data

(60) Provisional application No. 62/947,677, filed on Dec. 13, 2019.

(51) Int. Cl.
| | | |
|---|---|---|
| A47C 27/15 | (2006.01) | |
| A47C 21/04 | (2006.01) | |
| A47C 27/08 | (2006.01) | |
| A47C 27/14 | (2006.01) | |

(52) U.S. Cl.
CPC ............ *A47C 27/15* (2013.01); *A47C 27/085* (2013.01); *A47C 27/088* (2013.01); *A47C 27/144* (2013.01); *A47C 21/046* (2013.01)

(58) Field of Classification Search
CPC ..... A47C 27/15; A47C 27/085; A47C 27/088; A47C 27/144; A47C 21/046; A47C 27/056; A47C 27/05
See application file for complete search history.

(56) References Cited

U.S. PATENT DOCUMENTS

| | | | | |
|---|---|---|---|---|
| 8,668,977 | B2* | 3/2014 | Callsen | A47C 27/144 |
| | | | | 428/158 |
| 9,701,836 | B2* | 7/2017 | Chen | C08G 18/10 |
| 10,842,290 | B2* | 11/2020 | Demets | B29C 41/46 |
| 2006/0260060 | A1* | 11/2006 | Apperson | A47C 27/15 |
| | | | | 5/691 |
| 2007/0246157 | A1* | 10/2007 | Mason | A47C 27/085 |
| | | | | 264/299 |
| 2010/0005595 | A1* | 1/2010 | Gladney | A47C 27/148 |
| | | | | 156/219 |
| 2013/0025070 | A1* | 1/2013 | Ruehlmann | A47C 27/15 |
| | | | | 5/740 |
| 2015/0067967 | A1* | 3/2015 | Tyree | A47C 27/15 |
| | | | | 5/691 |
| 2015/0335168 | A1* | 11/2015 | Favata | A47C 27/15 |
| | | | | 297/452.61 |
| 2016/0286972 | A1* | 10/2016 | DeFranks | A47C 21/046 |

(Continued)

*Primary Examiner* — Justin C Mikowski
*Assistant Examiner* — Alison N Labarge
(74) *Attorney, Agent, or Firm* — McDonald Hopkins LLC

(57) ABSTRACT

A cushioning structure may be provided that utilizes multiple layers of differing materials, each providing a different aspect of comfort, cooling, and support. In one aspect of the invention a first layer comprises an elastomeric gel supported in a foam structure. In another aspect an additional layer comprises a liquid gel-infused viscoelastic foam. In a further aspect, an additional layer comprises a high-density polyurethane foam. In a further aspect, an additional layer comprises a foamed latex.

22 Claims, 4 Drawing Sheets

(56) References Cited

U.S. PATENT DOCUMENTS

2017/0224126 A1* 8/2017 O'Connell, Jr. ......... A47G 9/10
2019/0328150 A1* 10/2019 Nolte ..................... A47C 27/15
2021/0070606 A1* 3/2021 Corodemus .............. B32B 5/30

* cited by examiner

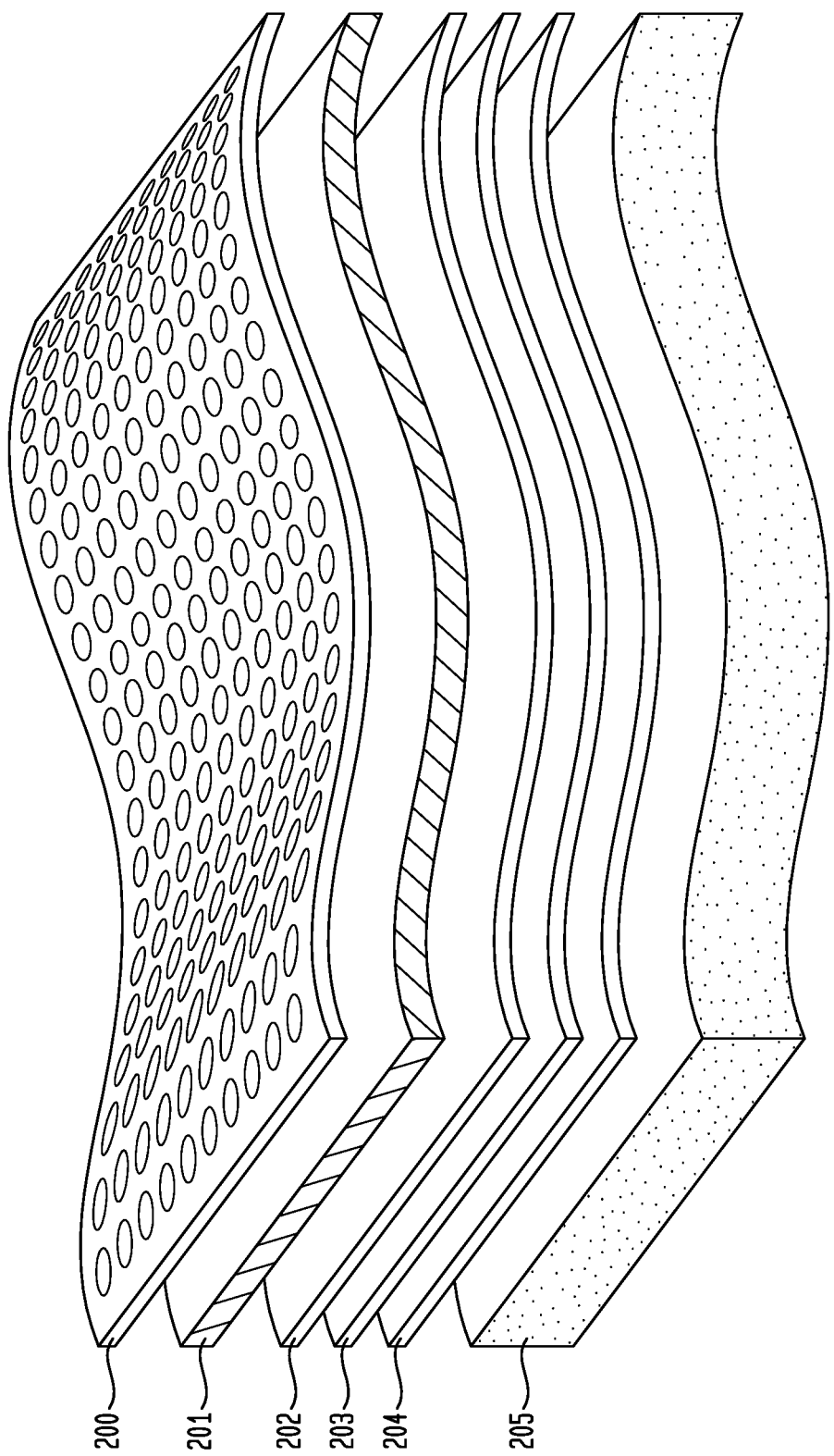

CUSTOMIZABLE CUSHIONING STRUCTURE FOR ADDRESSING MEDICAL CONDITIONS AND SYMPTOMS

CROSS-REFERENCE TO RELATED APPLICATIONS

This application claims the benefit of priority to U.S. Provisional Patent Application No. 62/947,677 filed Dec. 13, 2019 and entitled CUSTOMIZABLE CUSHIONING STRUCTURE FOR ADDRESSING MEDICAL CONDITIONS AND SYMPTOMS, the contents of which are herein incorporated by reference into the DETAILED DESCRIPTION herein below.

FIELD OF THE INVENTION

The present invention relates generally to the field of mattresses, mattress toppers and other cushioning structures that provide both cushioning and support to users who will be in a prone position for significant lengths of time by employing multiple layers of varying materials.

BACKGROUND OF THE INVENTION

Medically speaking, an individual's sleep quality affects one's overall health. The amount of sleep and quality of sleep can affect brain activity, heart rate, blood flow to the brain, and body temperature, spine alignment, and joint discomfort. Lack of sleep or quality sleep has been linked to obesity, stroke, depression, and hypertension. The quality of sleep an individual obtains is equally as important as the amount of time an individual spends in bed sleeping.

A number of solutions have been proposed to improve sleep quality. Some solutions propose different materials that improve comfort, often by reducing pressure points. Other solutions propose materials that reduce heat retention to provide a cooler feeling to users. Still other solutions propose materials that provide adequate support. Many of these solutions are designed for mass markets and propose comfort and support solutions that are aimed at the general population.

Cushioning solutions that are appropriate for the general population may not provide optimal cushioning, comfort and support to people with a number of medical conditions or symptoms, such as chronic back pain, joint pain or injuries, fibromyalgia, cancer and others. Further, such solutions often use materials that lack durability. There is thus a need for a durable mattress, mattress topper or other cushioning structure that provides cushioning, cooling and support and that can be customized for users with different medical conditions or symptoms.

SUMMARY OF THE INVENTION

The following presents a simplified Summary of the Invention in order to provide a basic understanding of some example aspects of the invention. This Summary is not an extensive overview of the invention. Moreover, this summary is not intended to identify critical elements of the invention nor delineate the scope of the invention. The sole purpose of the Summary is to present some concepts of the invention in simplified form as a prelude to the more detailed description that is presented later.

The presently disclosed invention overcomes many of the shortcomings of the prior art by providing a mattress, mattress topper or other cushioning structure that, in one embodiment, may include an upper layer composed of an elastomeric gel in a foam support structure, a liquid gel-infused memory foam layer, and a latex support layer.

In another embodiment, the cushioning structure may include an upper layer composed of an elastomeric gel in a foam support structure, a liquid gel-infused memory foam layer, a latex support layer and a high-density polyurethane core.

In another embodiment, the cushioning structure may include an upper layer composed of an elastomeric gel in a foam support structure, a liquid gel-infused memory foam layer, a latex support layer, a second liquid gel-infused memory foam layer and a high-density polyurethane core.

In another embodiment, the cushioning structure may include an upper layer composed of an elastomeric gel in a foam support structure, a liquid gel-infused memory foam layer, a latex support layer, a high-density polyurethane support layer and a high-density polyurethane core.

In another embodiment, the cushioning structure may include an upper layer composed of an elastomeric gel in a foam support structure, a liquid gel-infused memory foam layer, a latex support layer, a second liquid gel-infused memory foam layer, a high-density polyurethane support layer and a high-density polyurethane core.

BRIEF DESCRIPTION OF THE DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the presently disclosed invention, unless stated to be otherwise, are not necessarily drawn to scale.

FIG. 2 is a perspective view of a multiple layers that form part of a mattress including aspects of the present invention.

DETAILED DESCRIPTION OF THE INVENTION

Figure 1:
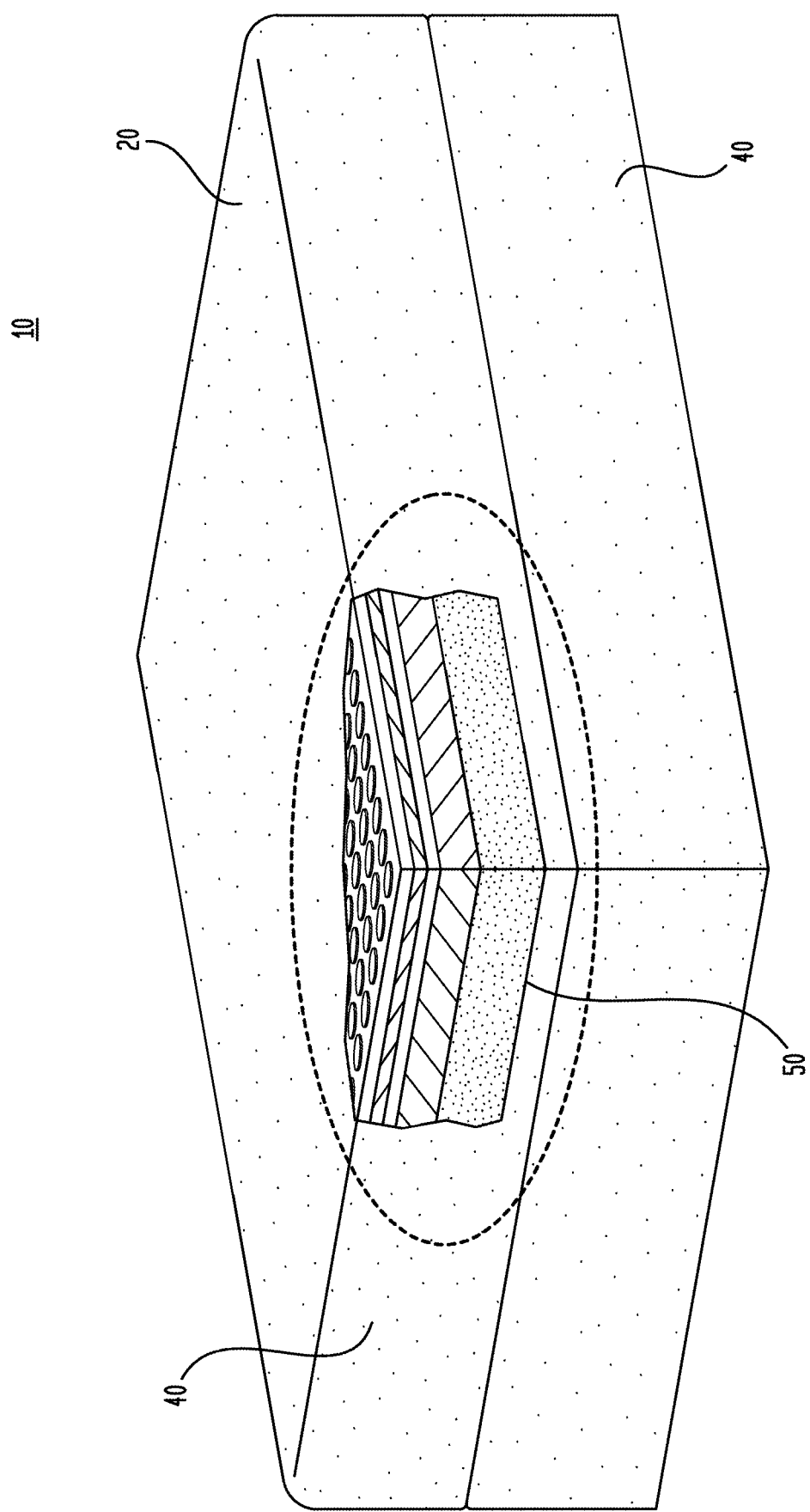
FIG. 1 is perspective view of an example mattress system containing multiple layers and including aspects of the present invention.

In the following description, the present invention is set forth in the context of various alternative embodiments and implementations involving a mattress, mattress topper or other cushioning structure that provides cushioning, cooling and support that can be customized for users with medical conditions or symptoms. While the following description discloses numerous exemplary embodiments, the scope of the present patent application is not limited to the disclosed embodiments, but also encompasses combinations of the disclosed embodiments, as well as modifications to the disclosed embodiments.

Various aspects of the customizable mattress, mattress topper or other cushioning structure may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Various aspects of the customizable mattress, mattress topper or other cushioning structure may be described and illustrated with reference to one or more exemplary implementations. As used herein, the term "exemplary" means "serving as an example, instance, or illustration," and should not necessarily be construed as preferred or advantageous over other variations of the devices, systems, or methods disclosed herein. "Optional" or "optionally" means that the subsequently described event or circumstance may or may not occur, and that the description includes instances where the event occurs and instances where it does not. In addition, the word "comprising" as used herein means "including, but not limited to".

Relative terms such as "lower" or "bottom" and "upper" or "top" may be used herein to describe one element's relationship to another element illustrated in the drawings. It will be understood that relative terms are intended to encompass different orientations of aspects of the customizable mattress, mattress topper or other cushioning structure in addition to the orientation depicted in the drawings. By way of example, if aspects of the customizable mattress, mattress topper or other cushioning structure in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

It must also be noted that as used herein and in the appended claims, the singular forms "a", "an", and "the" include the plural reference unless the context clearly dictates otherwise. For example, although reference is made to "a" phase change material, "a" support material, "an" upper layer, "a" top layer, and "the" base layer, one or more of any of these components and/or any other components described herein can be used.

Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and appended claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Unless defined otherwise, all technical and scientific terms used herein have the same meanings as commonly understood by one of ordinary skill in the art.

A symptom specific mattress, mattress topper or other cushioning structure with uniform support throughout that provides proper consistent cushioning, cooling, envelopment, circulation and support to the entire body which is usable in either a hospital or home setting comprising multiple layers of various compositions and densities. Where each layer is formed independently and then stacked in a specific manner to obtain the desired comfort, envelopment, cooling, softness/firmness and support for the mattress's unique symptom-specific purposes. Once the order and thickness of layers is determined, the layers are treated with glue or some other adherent typically used for foam layers and the layers are laminated. Depending on the specific use of the end product and manufacturing methods, the total number of layers can be laminated all at once, or lamination may occur with the addition of each layer. Multiple specific layers are utilized in creating the final mattress, each layer maybe used once, more than once, or not at all in any given mattress.

Figure 1A:
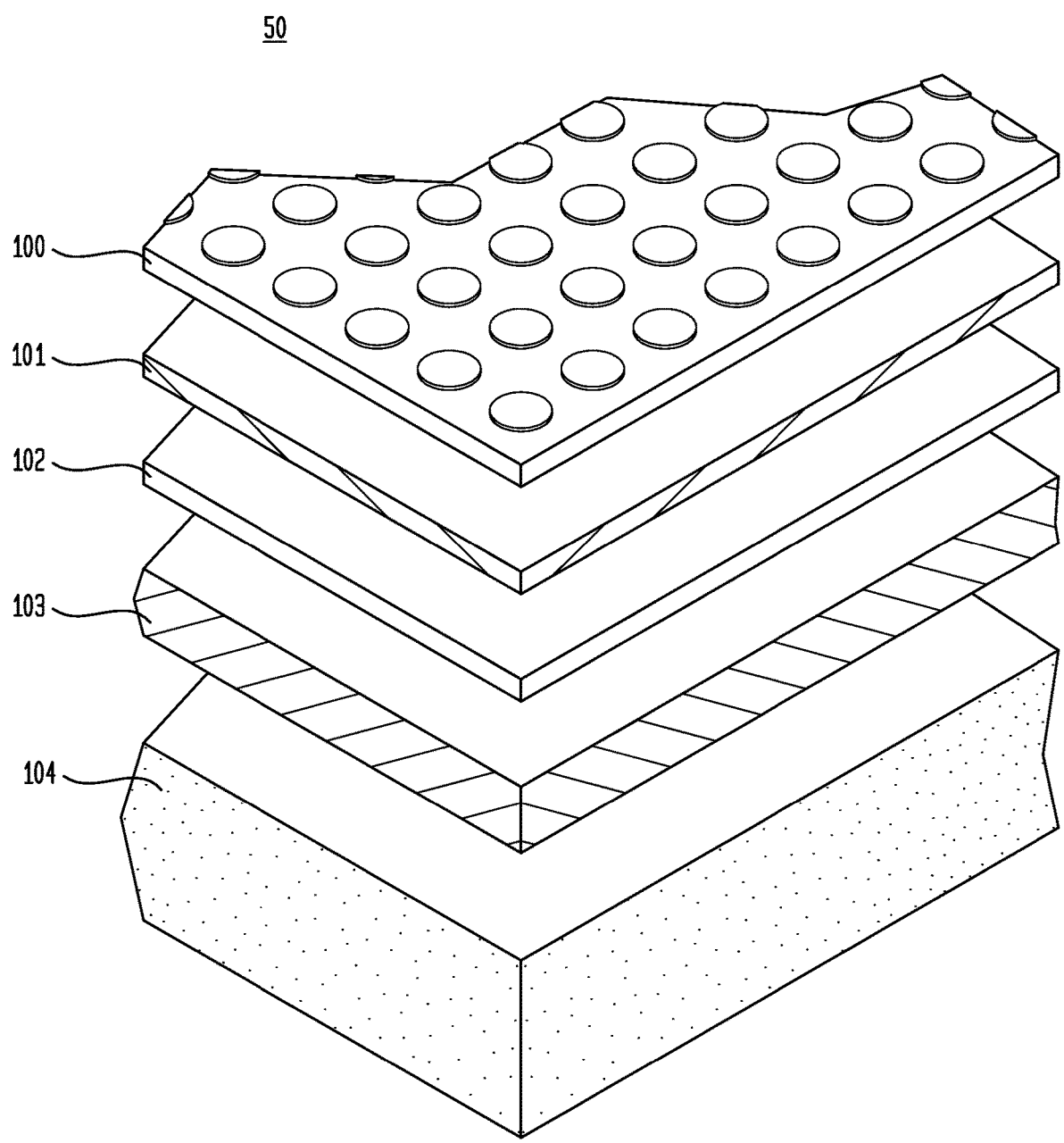
FIG. 1A is a closer view of the example mattress of FIG. 1 showing multiple layers and including aspects of the present invention.

FIGS. 1 and 1A show a perspective view of an example mattress system 10 including aspects of the present invention. Mattress system 10 contains two major components, mattress 20 and base 30. Mattress 20 has a mattress cover 40, which can be made of a number of suitable materials known in the art. In exemplary embodiments, mattress cover 40 consists of materials that effectively absorb or transfer heat from the user. Multiple layers 50 constitute the inner structure of mattress 20.

FIG. 1A shows a closer perspective of multiple layers 50 of the example mattress. Each of these layers will be substantially flat with lengths and widths to match the surface area of the cushioning structure (for example, standard mattress sizes such as twin, queen, king, etc.), and depths typically from about ½ inch to 6 inches, and of uniform material throughout.

Each of the multiple layers 50 will have its own specifications, or ranges of specifications. Such specifications can include density, Indentation Load/Force Deflection (ILD or IFD), compression, elongation, tensile strength, tear strength, air flow and recovery time, all as measured by standards known in the art.

In FIG. 1A upper layer 100 contains an elastomeric gel and, in a preferred embodiment, consists of an elastomeric gel supported in a foam structure. Layer 101 consists of gel-infused, reticulated, viscoelastic memory foam. Layer 102 consists of homogenous foamed latex. Layer 103 is a second layer of gel-infused, reticulated viscoelastic memory foam. Core layer 104 consists of high-density polyurethane.

Each of the multiple layers 50 will have its own specifications, or ranges of specifications. Such specifications can include density, Indentation Load/Force Deflection (ILD or IFD), compression, elongation, tensile strength, tear strength, air flow and recovery time, all as measured by standards known in the art.

It is known in the art that certain elastomeric gels contain the property of acting as a heat sink to remove heat generated by a user's body that comes in contact with any cushioning structure including such gel and thus provide a cooler surface temperate experience by the user. Such elastomeric gels may be incorporated into a mattress or other cushioning structure in various manners. Most such gel arrangement, while, providing some cooling to the user, often make no contribution to any cushioning affect.

In an example embodiment, the elastomeric gel of upper layer 100 can be placed in a supporting structure, such as polyurethane or other foam that supports and channels the gel. A more specific example of such a foam-supported gel structure can be found in U.S. Pat. No. 8,668,977, which is incorporate herein by reference and which discloses an elastomeric gel cured to a foam layer to create a bond. Said foam has a first and a second side where either the first or the second side may have an impression impressed on it. This impression forms channels and patterns into which the elastomeric gel will be distributed. When said first side is impressed, said foam layer will rest flat on said second side with said first side facing up. The channels and protrusions to be filled with gel may be formed in various patterns to provide proper support. In one embodiment, said protrusions may be hexagonal or pentagonal in shape. These protrusions will form a support surface, and are equally or randomly spaced out to form a pattern of channels which the elastomeric gel can than fill. Alternatively, the pattern can consist of recessed portions with channels that form a support surface, where the elastomeric gel can then fill said recessed portions. The protrusions and channels can be arranged and configured to obtain the desired level of support, firmness, or softness. In an exemplary embodiment, the foam and gel structure as a whole can be 1 inch thick while the patterned impression with said channels or protrusions has a thickness of between 3/8 inch and 1/4 inch. Other embodiments for upper layer 100 can range from 1/2 inch to 2 inches with appropriate thicknesses for the patterned impression of channels and protrusions. Overall, the thickness of said foam support in layer 100 should be thick enough to ensure the gel that fills the reticulated pattern does not leak. The impression surface of the foam is then filled with gel. In an exemplary embodiment, this supportive layer, comprised of foam layer with spaces filled by an elastomeric gel, is the top layer in the final assembled mattress, mattress topper or other cushioning structure.

In a preferred embodiment, the foam used for the supporting structure of the elastomeric gel in layer 100 can be a polymer latex. Polymer latexes that are suitable for use here are all dispersions in which the solid is dispersed in a liquid phase and this phase in turn forms an emulsion with a further liquid phase. Suitable aqueous latexes have a solid content from 20% to 75% by weight. This foam supporting structure also provides cushioning to the user.

Gel-infused foam layer 101, in an exemplary embodiment, consists of a high-density, viscoelastic polyurethane foam infused with liquid polymer gel. Viscoelastic foam consists mainly of polyurethane mixed with other chemicals to increase its viscosity and elasticity and is commonly referred to as "memory foam." Such foam is often reticulated to increase porousness and reduce density. Such viscoelastic foam can envelop and reduce counter pressure on bodily protrusions. This layer has a homogeneous consistency, provides a comfort layer and has fast recovery times.

Viscoelastic foam layer 101 can be infused with gel polymers. This gel infusion can reduce heat sensitivity and retention and decrease the "spring back" or "recovery" time of the foam. Some versions of gel infused memory foam has beads containing the gel which is a phase change material and creates temperature stabilization or a cooling effect by changing from a solid to liquid state within in the capsule. Others infuse the gel by swirling it in liquid form. In both cases, this changing of the physical state alters the heat absorption properties of the memory foam it is infused into.

In an exemplary embodiment, the gel-infused memory foam layer 101 is liquid gel-infused and has the following specification:

| PROPERTY | SPEC. | STANDARD |
|---|---|---|
| Density (lb/ft³) | 3.7-3.9 | ASTM D 3574 A |
| IFD 25% (lb<sub>f</sub>) | 10.0-12.0 | ASTM D 3574 B1 (at 4 inches) |
| 90% Compression (% Loss) | <10% | ASTM D 3574 D |
| Elongation | >180 | ASTM D 3574 E |
| Tensile strength (lb<sub>f</sub>/in²) | >5 | ASTM D 3574 E |
| Tear Strength (lb<sub>f</sub>/in) | >0.8 | ASTM D 3574 F |
| Air Flow (CFM) | >2 | ASTM D 3574 G |
| Recovery Time (s) | <2 | Simmons Protocol |

In customizing the cushioning structure, these specifications for example memory foam layer 101 outside of these ranges may be used. For example, viscoelastic foam layer may have a density that goes up to 5.2 lb/ft³. In some embodiments, these specifications can change as the thickness of the gel infused layer changes.

In a further exemplary embodiment, the gel infused memory foam layer 101 could include the additives of graphite, copper and/or oxygel and coatings of coolluminate, thermic, graphite, and/or copper.

In a further exemplary embodiment, the gel-infused viscoelastic memory foam layer 101 will be odorless; it will have a smooth or silky surface rather than porous; and it will also maintain consistent levels of support, cushioning, envelopment, and recovery time over a range of ambient temperatures from approximately 55° to 94° Fahrenheit.

Gel-infused foam layer 101 can be about 1/2 inches to 2 inches thick, and, in one exemplary embodiment, is approximately 1 inch thick.

In an exemplary embodiment, latex layer 102 is foamed latex layer, comprised of either natural, synthetic, or combined natural and synthetic latex and is a homogenous foam structure. This layer preferably possesses an excellent hysteresis and has a high tensile strength. This layer exhibits humidity control and limits the amount of moisture absorbed. This foamed latex layer has optimal ventilation properties throughout the foam structure to allow for temperature and humidity control throughout the layer and the assembled mattress. This foam latex layer can provide support in addressing certain medical conditions and symptoms and, in particular, to provide spinal support.

In an exemplary embodiment, the latex foam material of layer 102 can be prepared from natural rubber latex or from one or more of such synthetic latexes as polybutadiene/styrene latex, polybutadiene/acrylonitrile latex, polychloroprene latex and the like or from a mixture of natural rubber latex and one or more such synthetic latexes. The latex foam includes conventional latex foam as well as viscoelastic latex foam.

In a further embodiment, the latex foam of layer 102 could be vulcanized using microwave technology instead of the traditional steam vulcanization, so that the latex in the foamed latex layer is vulcanized endogenously. This microwave vulcanization starts in the middle of the latex product and gradually goes to the outside. The vulcanization is accomplished by pouring the liquid latex foam on a belt or the liquid latex layer can be poured into a preformed foam layer on a belt, and running it through a vulcanization station. This vulcanization station has an electromagnetic wave generator for electromagnetic waves with a frequency between 1 and 50 Mhz. Vulcanization can be accomplished completely by electromagnetic or micro-waves or the liquid latex foam can be partially treated with the electromagnetic waves and then the process can be completed by using steam to heat the latex foam. Said foamed latex layer can be made in a wide array of firmness's and can be altered to compliment the rest of the mattress structure. Latex here is being defined as a dispersion of polymeric particles in a continuous phase, the polymeric particles preferably having a size range from 10-100 nm.

An example of a latex foam product and processes for making such that can be used as the latex layer 102, in an exemplary embodiment, is disclosed in U.S. Pat. No. 10,842,290, which is incorporated herein by reference.

In an exemplary embodiment, the latex of layer 102 has the following specifications:

| PROPERTY | SPEC. | STANDARD |
|---|---|---|
| Density (kg/m$^3$) | 65 | ASTM D 3574 A |
| IFD 25% (lb$_f$) | 15 | ASTM D 3574 B$_1$ at 4 inches |
| 90% Compression (% Loss) | <7% | ASTM D 3574 D |
| Elongation | >400% | ASTM D 3574 E |
| Tensile strength (lb$_f$/n$^2$) | 12 | ASTM D 3574 E |
| Tear Strength (lb$_f$/in) | 3 | ASTM D 3574 F |

In an exemplary embodiment, the mattress shown in FIGS. 1 and 1A can include a second gel-infused viscoelastic foam layer 103. Layer 103 can be made from the same material as gel-infused layer 101. Layer 103 can be thicker than layer 101, ranging, in exemplary embodiments, from about 1 to 4 inches.

A core layer 104 may be included below the other layers. This core layer 104 supplies support for the cushioning structure. In an exemplary embodiment, such core layer consists of high-density polyurethane foam with added amounts of rubber in the polyurethane. Adding rubber to the polyurethane increases durability, bounce and comfort, and support properties, particular support at the edges of the cushioning structure so that someone can more comfortably sit on an edge. Said core layer 104 may have various levels of ILD/IFD. Core layer 104 can be adjusted in thickness to provide support for users of different weights.

Below are specifications for three different example material for core layer 104:

|  | Example 1 HD23 | Example 2 HD36 | Example 3 LUX |
|---|---|---|---|
| FOAM TYPE | 25030 High Resilience | 25030 High Resilience | 25030 High Resilience |
| FOAM COLOR | White/Cream | White | Light Blue |
| DENSITY LBS/FT | 2.25-2.50 Lbs/Ft$^3$ | 2.70-2.90 Lbs/Ft$^3$ | 2.70-2.90 Lbs/Ft$^3$ |
| ILD (LBS CU/FT) | 27-34 Lbs/50 in$^2$ | 32.00-38.00 Lbs/50 in$^2$ | 45-55 Lbs/50 in$^2$ |
| TENSILE (Psi) STRENGTH | 10.0 lbs/In$^2$ Minimum | 8 LBS/In$^2$ minimum | 8 LBS/In$^2$ minimum |
| TEAR (PPI) | 1.00 LBS/linear inch (minimum) | 1.00 LBS/linear inch (minimum) | 1.00 LBS/linear inch (minimum) |
| ELONGATION | 100% Minimum | 100% minimum | 100% minimum |
| SUPPORT FACTOR (65%/25%) | 2.50 Minimum | 1.80 minimum | 1.80 minimum |
| Bio-Polyol |  | Yes | Yes |
| FLAMMABILITY Test method | Pass ASTM D3574 | California 117 ASTM D3574 | California 117 ASTM D3574 |
| Smolder Resistant |  | Pass TB117-2013 NFPA 260 | Pass TB117-2013 NFPA 260 |

In exemplary embodiments, core layer 104 can be 1) made according to the HD23 specifications above and be 3 inches thick for a mattress designed for a child, 2) made according to the HD36 specification and be 5 inches thick for a mattress designed for a normal-sized adult, and 3) made according to the LUX specifications and be 5 inches thick for a mattress designed for a heavy adult.

While each of the multiple layers 50 within mattress 20 is designed individually to provide optimal support and performance it is the specific combinations and arrangements of layers that create said symptom-specific cushioning structure. Each layer is designed to have its own resiliency, density, ILD, and other specification so that the various layers can be configured to provide the desired support characteristics. Outlined below are example embodiments of different combinations that form symptom specific mattresses and one mattress topper. Furthermore, the thickness for each layer except the core layer will be in the range of ½ to 4" optimally. The high-density core, which forms the base of the cushioning structure, will range between 3" to 5" optimally.

FIG. 2 shows the multiple layers for another exemplary mattress embodiment. Layer 200 consists of elastomeric gel in a foam support structure. Layer 200, in an exemplary embodiment, can be 1 inch thick or, alternatively, in a range from ½ to 2 inches thick. Layer 201 consists of gel-infused viscoelastic foam. Layer 202, in an exemplary embodiment can be 2 inches thick or in a range from 1 inch to 3 inches thick. Layer 202 is a support layer consisting of high-density polyurethane, of the same or similar substance as that of core layer 104 in FIGS. 1 and 1A. In an exemplary embodiment, Layer 202 can be 1 inch thick and made according to the HD36 specification and, alternatively, can be 1 inch to 3 inches thick. Layer 203 consists of foamed latex. Layer 203, in an exemplary embodiment can be 1 inch thick or, alternatively, in a range from ½ inch to 2 inches thick. Layer 204 is a second gel-infused memory foam layer. Layer 204, in an exemplary embodiment, can be 1 inch thick or, alternatively, in a range from 1 inch to 3 inches thick. Core layer 205 consists of high-density polyurethane, of the same or similar substance as that of core layer 104 in FIGS. 1 and 1A. In an exemplary embodiment, layer 205 can be 5 inches thick and made according to the LUX specification and, alternatively can be 3 inch to 6 inches thick and may also be made according to the HD23 or HD36.

Figure 3:
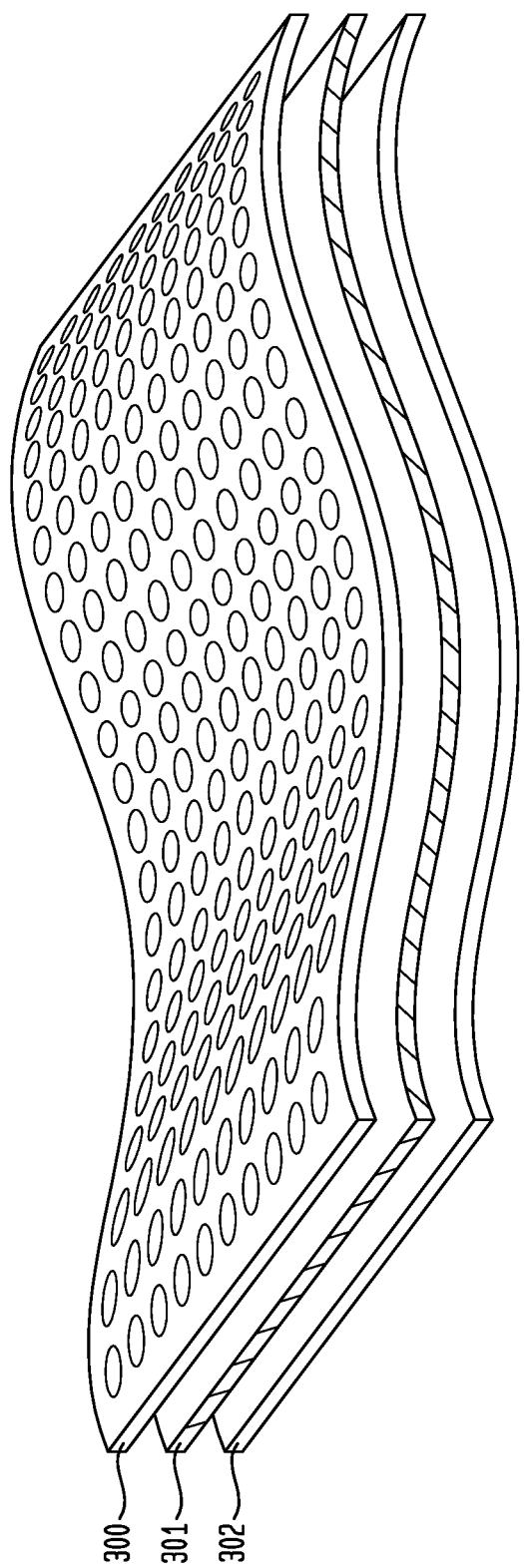
FIG. 3 is a perspective view of a multiple layers that form part of a mattress topper including aspects of the present invention.

FIG. 3 shows the multiple layers of an exemplary embodiment mattress topper. Layer 300 consists of elastomeric gel in a foam support structure. Layer 301 consists of foamed latex. Layer 302 consists of gel-infused viscoelastic foam. Layers 300, 301 and 302, in an exemplary embodiment, can each be 1 inch thick or, alternatively, in ranges from ½ to 2 inches thick.

As can be seen from the example mattress layers of FIGS. 1, 1A and 2, the example mattress topper of FIG. 3, and the additional examples below, layers of the different disclosed materials may be stacked in different orders, combinations and thicknesses to provide customized solutions to users of different weights and with different conditions and symptoms. These customized solutions can provide optimal levels of adaptive comfort and envelopment of bodily pressure points so as to reduce counter pressure and decrease muscle tension, absorption of body heat, spinal support, and avoid restriction of circulation. Following are some additional examples of customized solutions.

In one example, the layers of a mattress can include a 1-inch layer of elastomeric gel in a foam support structure, a 1-inch gel-infused viscoelastic foam layer, a 2-inch foamed latex layer, and 2-inch gel-infused viscoelastic foam layer, and a 5-inch high-density polyurethane core layer.

In another example, the layers of a mattress can include a 1-inch layer of elastomeric gel in a foam support structure, a 2-inch gel-infused viscoelastic foam layer, a 1-inch foamed latex layer, a 2-inch gel-infused viscoelastic foam layer, and a 5-inch high-density polyurethane core layer.

In another example, the layers of a mattress can include a 1-inch layer of elastomeric gel in a foam support structure, a 1-inch gel-infused viscoelastic foam layer, a 1½-inch support layer of high-density poly urethane foam layer, a 1-inch foamed latex layer, a 2-inch gel-infused viscoelastic foam layer, and a 5-inch high-density polyurethane core layer.

In another example, the layers of a mattress can include a 1-inch layer of elastomeric gel in a foam support structure, a 1-inch foamed latex layer, a 2-inch gel-infused viscoelastic foam layer, a 1½-inch support layer of high-density poly urethane foam, and a 5-inch high-density polyurethane core layer.

In another example, the layers of a mattress topper can include a 1-inch layer of elastomeric gel in a foam support structure, a 1-inch gel-infused viscoelastic foam layer, and a 1-inch foamed latex layer.

An additional layer to use in a customized cushioning structure, not mentioned in the embodiments and examples above, includes a viscoelastic polyurethane foam that is highly-reticulated and of lower-density than the gel-infused viscoelastic foam described above. The material of this layer can also be blended with high resiliency polyurethane foam. This layer can provide an increased softness and level of envelopment to a cushioning structure.

The choice, properties, order, and thicknesses of layers can be selected to customize a solution for a particular user or class of users based on a number of criteria. These criteria include the symptoms and condition of the user, such as whether the user is experiencing, joint, spinal or skeletal pain or whether the user has a particular diagnosis such as fibromyalgia, cancer, MS, MD, sleep apnea, Parkinson's Disease, arthritis, diabetes, circulatory issues, severe hip and shoulder pain, lupus, pregnancy, sciatica, scoliosis, herniated discs, or others. Further, statistics concerning the user, including gender, height, weight, body mass, and measurements including shoulders, chest stomach, hips, deformities, and braces can be used. Further, the user's sleeping position can be taken into account, such as sleeping on the side or back. If the user lies on his or her back, the hips must drop far enough into the mattress to create support for the lumbar curve so when the user falls asleep so that the lumbar will not flatten causing spinal stress. If the user lies on his or her side, the spine should be straight with the shoulders and hips being perpendicular. If the shoulders or hips are rounded there are too much counter pressure against the joints which in turn stresses muscle groups and contorts the spine. Further, a mercury pressure mapping pad can be used that measures counter pressure against the body from the user's head to feet. This helps determine whether there is no or minimal restriction of circulation, minimal counter pressure against joints and other body parts, and stable lumbar and overall spinal support. All or some number of these factors can be taken into account in customizing the layers of the cushioning structure.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claim and any additional claims that may be submitted.

What is claimed is:

1. A multiple layer cushioning structure, comprising:
   an upper layer comprising
      a foam structure including an upper surface and an impression area on the upper surface, wherein the impression area comprises a plurality of channels, a plurality of protrusions positioned within the plurality of channels, and an elastomeric gel disposed within the plurality of channels, wherein the elastomeric gel fills the impression area completely;
   a gel-infused, reticulated, viscoelastic memory foam layer disposed below the upper layer;
   a homogeneous foamed latex layer disposed below the viscoelastic memory foam layer;
   a second gel-infused, reticulated, viscoelastic memory foam layer disposed below the homogeneous foamed latex layer; and
   a high-density polyurethane foam layer disposed below the second viscoelastic memory foam layer.

2. The cushioning structure of claim 1, further comprising a second high-density polyurethane layer disposed below the viscoelastic memory foam layer above the homogeneous foamed latex layer.

3. The cushioning structure of claim 2, wherein the upper layer is between approximately ½ inch and 3 inches thick.

4. The cushioning structure of claim 2, wherein the gel-infused viscoelastic memory foam layer has the gel infused as a liquid.

5. The cushioning structure of claim 2, wherein the gel-infused viscoelastic memory foam layer varies in recovery time and indentation load or force deflection by less than 25% over an ambient temperature range of approximately 55° to 94° Fahrenheit.

6. The cushioning structure of claim 2, wherein the gel-infused viscoelastic memory foam layer has a recovery time of approximately 2 seconds or less.

7. The cushioning structure of claim 2, wherein the gel-infused viscoelastic memory foam layer has density of approximately 3.7 pounds per cubic foot or greater.

8. The cushioning structure of claim 2, wherein the gel-infused viscoelastic memory foam layer is between approximately ½ inch and 3 inches thick.

9. The cushioning structure of claim 2, wherein the homogeneous foamed latex layer is vulcanized endogenously.

10. The cushioning structure of claim 1, wherein the upper layer is between approximately ½ inch and 3 inches thick.

11. The cushioning structure of claim 1, wherein the gel-infused viscoelastic memory foam layer has the gel infused as a liquid.

12. The cushioning structure of claim 1, wherein the gel-infused viscoelastic memory foam layer varies in recovery time and indentation load or force deflection by less than 25% over an ambient temperature range of approximately 55° to 94° Fahrenheit.

13. The cushioning structure of claim 1, wherein the gel-infused viscoelastic memory foam layer has a recovery time of approximately 2 seconds or less.

14. The cushioning structure of claim 1, wherein the gel-infused viscoelastic memory foam layer has density of approximately 3.7 pounds per cubic foot or greater.

15. The cushioning structure of claim 1, wherein the gel-infused viscoelastic memory foam layer is between approximately ½ inch and 3 inches thick.

16. The cushioning structure of claim 1, wherein the homogeneous foamed latex layer is vulcanized endogenously.

17. The cushioning structure of claim 1, wherein each of the plurality of protrusions are surrounded on all sides by the plurality of channels.

18. The cushioning structure of claim 1, wherein each of the plurality of protrusions are surrounded on all sides by the elastomeric gel.

19. The cushioning structure of claim 1, wherein the plurality of channels are interconnected to one another.

20. The cushioning structure of claim 1, wherein the plurality of protrusions extend above the elastomeric gel.

21. The cushioning structure of claim 1, wherein the plurality of channels do not extend to a bottom surface of the upper layer.

22. The cushioning structure of claim 1, wherein the elastomeric gel does not extend to a bottom surface of the upper layer.

\* \* \* \* \*